United States Patent [19]

Oda et al.

[11] Patent Number: 4,584,003

[45] Date of Patent: Apr. 22, 1986

[54] APPARATUS FOR TREATING DUST-CONTAINING GAS

[75] Inventors: Noriyuki Oda, Chiba; Haruo Watanabe, Funabashi; Tomohiro Morishita, Takasago, all of Japan

[73] Assignee: Asahi Glass Company Ltd., Tokyo, Japan

[21] Appl. No.: 606,199

[22] Filed: May 2, 1984

[30] Foreign Application Priority Data

| May 6, 1983 [JP] | Japan | 58-78223 |
| Jun. 7, 1983 [JP] | Japan | 58-100280 |
| Sep. 20, 1983 [JP] | Japan | 58-172152 |

[51] Int. Cl.$^4$ .................. B01D 50/00; B01D 39/20
[52] U.S. Cl. ................. 55/269; 55/337; 55/338; 55/341 NT; 55/341 M; 55/431; 55/502; 55/97
[58] Field of Search ........... 55/80, 97, 269, 337, 55/338, 341 NT, 341 M, 431, 466, 502, 523; 165/134 R

[56] References Cited

U.S. PATENT DOCUMENTS

| 3,004,627 | 10/1961 | Wehn | 55/337 |
| 3,327,456 | 6/1967 | Guber et al. | 55/269 |
| 3,436,898 | 4/1969 | Hess et al. | 55/269 |
| 3,520,109 | 7/1970 | Caskey | 55/97 |
| 3,630,005 | 12/1971 | Reinauer | 55/341 M |
| 3,710,558 | 1/1973 | Feuer | 55/338 |
| 4,162,148 | 7/1979 | Fürstenberg | 55/337 |
| 4,224,982 | 9/1980 | Frei | 165/134 R |
| 4,236,576 | 12/1980 | Deuse et al. | 165/134 R |
| 4,378,976 | 4/1983 | Rush | 55/80 |

FOREIGN PATENT DOCUMENTS

| 2059435 | 6/1972 | Fed. Rep. of Germany | 55/338 |
| 36776 | 5/1978 | Japan | 55/337 |

*Primary Examiner*—David L. Lacey
*Attorney, Agent, or Firm*—Oblon, Fisher, Spivak, McClelland & Maier

[57] ABSTRACT

An apparatus for treating a dust-containing gas which comprises at least one vertically arranged filtration tube made of a solid porous material, a first filration tube supporter provided at the outer and upper part of the at least one filtration tube, a second filtration tube supporter provided at the outer and lower part of the at least one filtration tube, sealing means for dust respectively provided at a connecting part between the first filtration tube supporter and the at least one filtration tube and at a connecting part between the second filtration tube supporter and at least one filtration tube, an upper case with a dust-containing gas inlet which is placed above the first filtration tube supporter, a middle case with at least one clean gas outlet for supporting the first and second filtration tube supporters and a lower case with a dust discharging port which is placed below the second filtration tube supporter.

17 Claims, 11 Drawing Figures

APPARATUS FOR TREATING DUST-CONTAINING GAS

FIELD OF THE INVENTION

The present invention relates to a method of treating a high temperature dust-containing gas with a filtration wall made of a solid porous material and an apparatus for treating such gas.

BACKGROUND OF THE INVENTION

There has so far been known an apparatus for removing dust in a dust-containing gas with use of filtration tubes made of a solid porous material as shown in FIG. 1. In FIG. 1, a plurality of filtration tubes 1 made of a solid porous material having gas-permeability are vertically arranged in parallel with each other, with their lower ends closed and their upper end opened. The filtration tubes 1 whose outer and upper ends are supported by a supporting plate 70 in a gas-tight manner, are received in a middle case 2b which is provided with a dust-containing gas inlet 3 in its side wall. A lower case 2c functions as a hopper for dust separation and is provided at its bottom part with a dust discharging port 5 and a discharging valve 5a through which dust separated is intermittently taken out. A clean gas outlet 4 is formed at the top of an upper case 2a.

In the operation of the conventional apparatus, a dust-containing gas fed through the dust-containing gas inlet 3 is introduced into a space outside the filtration tubes, and only a clean gas is caused to pass through the tube wall of the filtration tubes 1 from the outside of the tubes to the inside thereof due to pressure difference between the interior and the exterior of the filtration tubes. Thereafter, the clean gas is discharged through the clean gas outlet 4 out of the system. On the other hand, dust blocked from passing through the filtration tubes gradually accumulates on the outer wall of the filtration tubes with the lapse of time. The dust having accumulated on the outer walls occasionally falls on the bottom of the lower case 2c where it is collected, while the accumulated dust forms a filtration layer which performs a precise filtration for a dust-containing gas.

When the thickness of dust layer formed by accumulation of dust increases, the pressure difference between the exterior and the interior of the filtration tube becomes large. Accordingly, the dust layer on the filtration tubes should be removed by reverse cleaning at predetermined time intervals to reduce permeation resistance. Such dust removing apparatus is disclosed, for example, in "Wasser Luft und Betrieb" 16 (1972) Nr2 Page 61-62, titled "Verfahren zur Trockenreinigung von heissen Gasen"; "Chemical Engineering" Oct. 1981, Page 34-49, titled "Ceramic filter and application thereof"; Japanese Unexamined Patent Publication No. 3620/1983; and Japanese Unexamined Patent Publication No. 3621/1983.

Filtration of a dust-containing gas with use of a gas-permeable porous material is performed by using a surface filtration structure in which a dust layer accumulated on the surface of the porous material is used as a filtration layer. Accordingly, when a porous cylindrical body is used, it is advatageous from the viewpoint of pressure loss to use an outer wall having a large surface area as a filtration surface, but not an inner wall having a small surface area. In this case, even when dust enters into the outer surface of the filtration tube to a certain extent to cause abnormally large pressure loss in the filtration tube 1, it is easy to reuse it by scraping the outer wall of the filtration tube by a brush or a whetstone. Similarly, in a case using the outer wall of the filtration tube 1 as a filtration surface, even when dust enters inside the filtration tube to fill the pores, the dust can be easily removed by means of reverse cleaning (i.e. reverse flowing of a clean gas from the side of the inner wall) because distribution of the pores is substantially uniform in the radial direction of the filtration tube and the sectional area through which a gas is passed becomes large along the flow of the gas. In other words, the number of branches of open pores communicated from the inner wall side to the outer wall side increases toward the outer surface side of the filtration tube 1.

Although the conventional dust removing apparatus has advantage as above-mentioned, it has not been practised on a large size and in an industrial scale. The reason of this is considered as follows.

Use of a filtration tube made of a material such as ceramics is desirable under an elevated temperature condition. However, the length of a single filtration tube is limited to at most about 2 meters or so because the ceramic filtration tube before sintering generally has an extremely small strength. Accordingly, a filtration tube of a considerable length is apt to be deformed in the course of handling and sintering. There has been proposed a technique to bond with an adhesive filtration tubes in the longitudinal direction. It, however, causes difficulty in its bond strength. Further, there is another system as shown in FIG. 2 in which a plurality of filtration tubes are stacked in the longitudinal direction, a flange 31 is applied at the lowermost end to support a series of the filtration tubes, the flange is suspended with a metallic long bolt 33 which is inserted from the top of the series of filtration tubes to pass through the inside thereof, and a spring 32 is provided on the uppermost filtration tube to compensate the thermal expansion of the long bolt 33. The system has, however, many disadvantages. An excessive elongation of the long bolt 33 takes place when passing a high temperature gas; a creep and corrosion may be caused in the long bolt 33; the apparatus is unstable in structure against earthquakes and vibrations; and, if an arm (not shown in the drawing) is secured to the middle case 2b to support the flange 31 for a stable structure against the earthquakes and vibrations, dust tends to accumulate on such supporting means as the arm and remains on it. These problems have prevented use of long filtration tubes. Accordingly, the amount of gas to be treated per unit area for installation is extremely small, and the conventional apparatus has not been suitable for industrial use for treatment of a large amount of air.

Further, when a gas having a high dust concentration should be treated, since dust deposits on the outer surface of the filtration tube 1 except for relatively coarse particle dust which freely falls, increase of pressure difference between the inner and outer walls of the filtration tube is so rapid that it is necessary to carry out frequently reverse cleaning. This increases the cost of electric power for a blower for reverse cleaning, and an additional gas-treating apparatus should be installed taking into account of reduction in throughput at the time of the reverse cleaning. Accordingly, initial investment is large.

OBJECTS OF THE INVENTION

It is an object of the present invention to provide a method of and an apparatus for treating a dust-containing gas with use of a filtration wall made of a gas-permeable solid porous material in which the amount of gas to be treated per unit area for installation can be large. It is a further object of the present invention that, even when a gas having a high dust concentration is treated, the frequency of reverse cleaning can be small or the reverse cleaning can be needless.

SUMMARY OF THE INVENTION

One aspect of the present invention is to provide a method of treating a dust-containing gas which comprises feeding a dust-containing gas to one of a number of spaces which are separated by a vertically arranged filtration wall made of a solid porous material from the upper side of the one space to collect dust at the lower side of the one space while the gas is caused to pass through the filtration wall to the other space.

Another aspect of the present invention is to provide an apparatus for treating a dust-containing gas which comprises at least one vertically arranged filtration tube made of a solid porous material, a first filtration tube supporter provided at the outer and upper part of the filtration tube, a second filtration tube supporter provided at the outer and lower part of the filtration tube, sealing means for dust respectively provided at a connecting part between the first filtration tube supporter and the filtration tube and at a connecting part between the second filtration tube supporter and the filtration tube, an upper case with a dust-containing gas inlet which is placed above the first filtration tube supporter, a middle case with at least one clean gas outlet for supporting the first and second filtration tube supporters, and a lower case with a dust discharging port which is placed below the second filtration tube supporter.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 2:
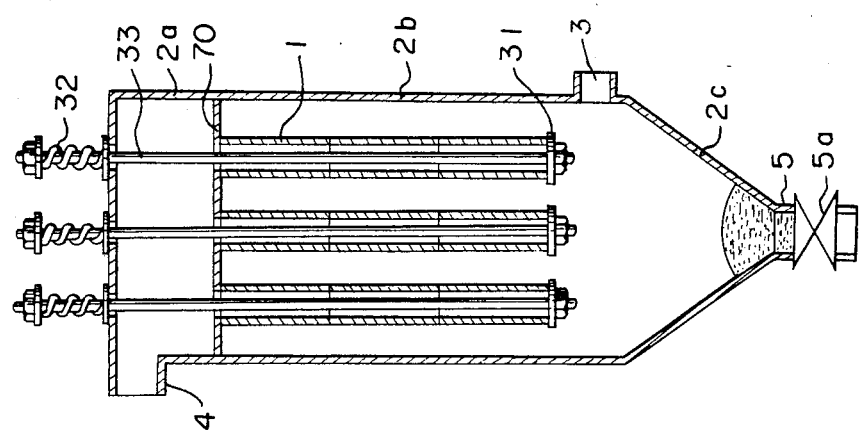
FIGS. 1 and 2 are respectively vertical cross-sectional views of conventional dust removing apparatuses.
Figure 1:
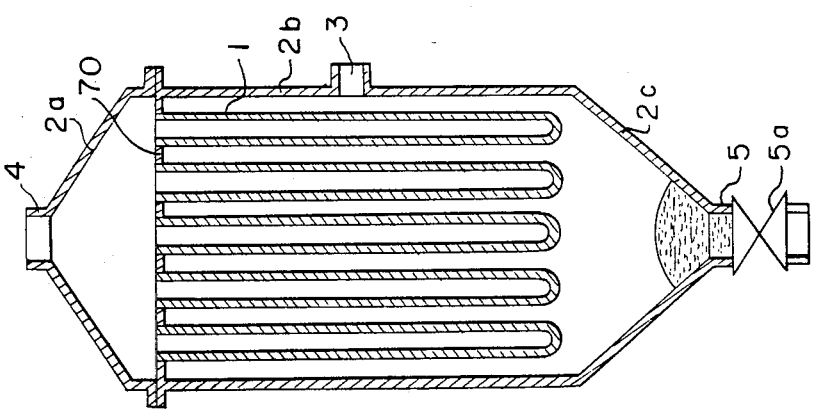

In the following, the present invention will be explained in detail.

A dust-containing gas used in the present invention refers to a gas containing dust. A clean gas refers to a gas substantially containing no dust. It may, however, contain a slight amount of dust. Namely, the dust-containing gas is a relative concept with respect to the clean gas, and a gas having a concentration of dust lower than the dust-containing gas is referred to as a clean gas. Normally, dust means useless material; the term "dust" is, however, not limited to the that definition and "dust" may be useful material. Accordingly, the treating method or apparatus of the present invention may be used for various purposes of obtaining a clean gas from a dust-containing gas, for obtaining dust from a dust-containing gas such as, for example, recovery of useful powdery products produced by a gas phase reaction, or for obtaining dust and a clean gas together.

In the present invention there is prepared a filtration wall made of a gas-permeable solid porous material arranged in the vertical direction. Preferably the filtration wall is a filtration tube made of such a solid porous material, particularly a filtration tube formed by connecting a plurality of unit filtration tubes in a coaxial manner. A dust-containing gas is fed from the upper side of one of a number of spaces separated by the filtration wall or from the upper side of the filtration tube at a relatively high velocity to collect coarse particles in the dust by utilizing the inertial movement while the main stream of dust-containing gas is caused to pass through the filtration wall or the filtration tube to obtain a clean gas from the other space. Thus, a precise filtration is carried out. The coarse particle dust falling at a high velocity usually scrapes the dust accumulated on the filtration wall, whereby it is unnecessary to carry out the reverse cleaning of the filtration wall, the frequency of the reverse cleaning is reduced even though it is necessary, or the portion of the wall to be subjected to the reverse cleaning are limited. In this case, the amount of the gas to be treated per unit area for installation increases as the flow rate of the dust-containing gas fed to one of the spaces separated by the filtration wall increases to thereby increase the effect of scraping the dust accumulated on the filtrtion wall due to the coarse particle dust. However, when the flow rate of the dust-containing gas is excessively high, not only the dust layer accumulated but also the filtration wall itself is scraped depending on a particle size distribution in the dust-containing gas and the amount and the shape of hard particles contained in the dust. It is therefore preferable that the velocity of the gas stream at the upper part of the filtration wall, especially the downward component of the velocity, is 100 m/s or less, more preferably 50 m/s or less taking into account pressure loss. When the downward component of the velocity at the upper part of the filtration wall is about 2 m/s or so, the scraping effect obtained by the coarse particle dust becomes small. Accordingly, the gas velocity is preferably 5 m/s or more. Since the downward component of the velocity of the dust-containing gas in one of the spaces separated by the filtration wall becomes small with the lower part of the filtration wall, the downward velocity of the dust becomes small due to viscosity of the gas. Therefore, while fine particles collide with each other to become coarse particles as the dust goes downward in the space, the effect of inertial dust collection decreases and the effect of scraping of the accumulated dust by the coarse particle dust also becomes small due to reduction in the downward velocity of the dust.

In the first embodiment of the present invention, a part of dust-containing gas is taken out from the lower part of one of the spaces together with the dust so that a relatively large downward movement of the coarse particle dust is obtained even at the lower part of the filtration wall, whereby the effect of scraping the accumulated dust is attained in almost the entire region of the filtration wall as well as the inertial dust collection effect. In this case, a technique of delivering for circulating a part of the dust-containing gas taken out from the lower part of the space to the upper portion of the space is included in a desirable embodiment of the present invention. Thus, it is possible to isolate only a clean gas and dust out of the system from the dust-containing gas fed into the system.

A technique of delivering for circulating a part of the dust-containing gas taken out from the lower part of the space to a dust producing source is also contained in a desirable embodiment of the present invention. As a result, when, for example, a dust-containing gas source is a fluid catalytic cracking apparatus, a gas including cracking catalyst (which is a useful and reusable dust) can be effectively recovered for its reuse. In addition, heat energy contained in the gas can be also effectively utilized.

A filtration wall and a filtration tube or a unit filtration tube, which will be described in detail, should have an adequate gas-permeability and a high temperature resistance. Although they can be formed of a sintered body of powder metallurgy consisting of a material such as carbon steel or stainless steel, a sintered body of ceramics is preferably utilized because of its having excellent high temperature resistance and anticorrosion properties. Particularly, it is most preferable to use ceramics such as mullite, cordierite, fused silica, lithium aluminum silicate, aluminum titanate, silicon carbide, silicon nitride, carbon, and so forth. Although the average diameter of pores of the solid porous material is suitably selected depending on the average particle diameter and the particle size distribution of the dust in the dust-containing gas and the dust concentration in a clean gas to be obtained, it is preferable that the average diameter of pore of the solid porous material is 0.2–6 times as large as the average particle diameter of the dust, especially 0.5–3 times as large as the average particle diameter, to perform high dust collecting efficiency and high gas-treating rate.

In the present invention, a plurality of flat filtration walls may be arranged in parallel to each other to define a plurality of spaces and these spaces may be used alternately as spaces through which the dust-containing gas flows and the spaces through which the clean gas flows. Alternatively, as a preferred embodiment, a filtration tube having upper and lower open ends is used instead of the filtration wall, and the inner part of the filtration tube is used as the space through which the dust-containing gas flows. Thus, with use of the filtration tube instead of the filtration wall, there is obtainable a gas treating apparatus constructed in such a manner that the mechanical strength of the filtration wall is improved, and the clean gas and dust are easily separated by feeding the dust-containing gas in the inner part of the filtration tube. The filtration tube is preferably of a circular shape in cross section taking account of easiness of manufacture and strength, although it may have a square shape in cross section.

It may be such that the dust-containing gas is fed in the filtration tube so as to cause swirling movement in the peripheral direction of the filtration tube. The consequence of this construction is that the coarse particle dust in the dust-containing gas is subject to a strong centrifugal force, and the coarse particle dust descends with swirling movement along the inner wall of the filtration tube while fine particle dust in the dust-containing gas is subject to a high viscosity and disturbance in the gas stream, and the fine particle dust descends with swirling movement along the central portion of the filtration tube at a high velocity. Thus, coarse particle dust in the dust-containing gas is separated by centrifugal force and is caused forcibly to swirl in the vicinity of the inner wall of the filtration tube at a high velocity along with the swirling movement of the gas, whereby the dust accumulated on the inner wall of the filtration tube is forcibly scraped by the coarse particle dust.

In a preferred embodiment of the apparatus for treating dust-containing gas of the present invention, the filtration tube is formed of a plurality of unit filtration tubes connected in the longitudinal direction, and the connecting part between the adjacent unit tubes is supported by a third filtration tube supporter which is held by the middle case. Further, a sealing means for dust is provided between the third filtration tube supporter and a connecting part of the unit filtration tubes. The construction as above-mentioned allows a gas treating apparatus provided with a long filtration tube formed of a plurality of the unit filtration tubes instead of a single integral long filtration tube which is difficult to manufacture. Additionally, it makes it unnecessary to bond with an adhesive the joining parts of the unit filtration tubes.

At least one among the first, the second, and the third filtration tube supporters may have at its inside a coolant passage. The filtration tube supporters used for the treating apparatus of the present invention are normally made of metal. Metal filtration tube supports have been considered to be inadequate from the viewpoint of a high temperature resistance when they are used to treat a high temperature dust-containing gas. It is, however, possible to maintain the filtration tube supporters at a predetermined temperature or below and to improve durability of the sealing means for dust by passing a coolant in the coolant passage. The coolant passage is preferably formed in all of the filtration tube supporters. However, the coolant passage may be formed in any one of the supporters. Further, when a plurality of third filtration tube supporters are used, the coolant passage may be formed in a part of the filtration tube supporters.

THE FIRST EMBODIMENT

A preferred embodiment will be described with reference to FIGS. 3 through 7.

Figure 3:
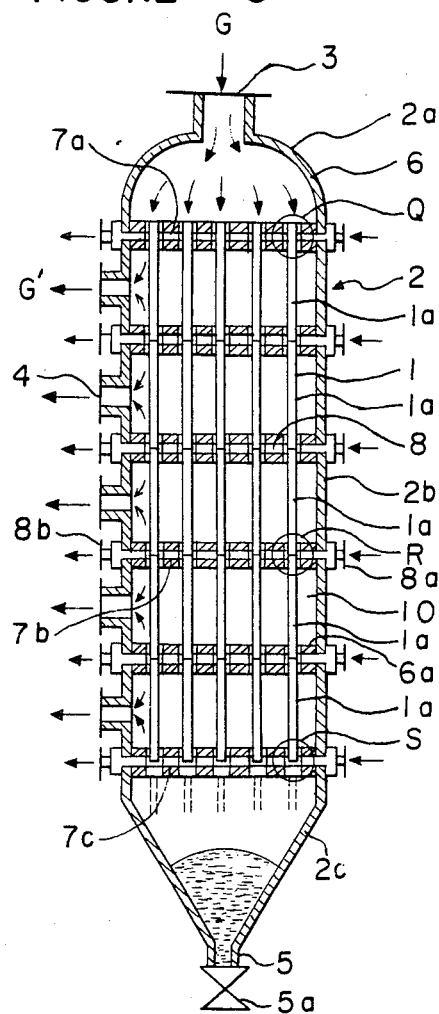
FIGS. 3 and 4 are respectively a vertical cross-sectional view and a plan view of a first embodiment of the gas treating apparatus of the present invention.

In FIG. 3, there are provided a plurality of filtration tubes 1 made of a solid porous material with upper and lower open ends (the thickness of the filtration tube is omitted in the drawing). Each of the filtration tubes is formed of a plurality of unit filtration tubes 1a (five unit filtration tubes are used in the illustrated embodiment) made of a solid porous material which is coaxially connected in the vertical direction. A generally tower-shaped container 2 is constituted by an upper case 2a, a middle case 2b, and a lower case 2c. Each of the cases is made of steel plate and has an inner lining of a heat insulation material. The upper case 2a is provided at its top end with dust-containing gas inlet 3, the middle case 2b has a clean gas outlet 4 in its side wall, and the lower case 2c, which functions as a dust hopper, is provided at its bottom part with a dust discharging valve 5a and a dust discharging port 5.

Each of an upper tube sheet 7a (which functions as a first filtration tube supporter), a middle tube sheet 7b (which functions as a third filtration tube supporter), and a lower tube sheet 7c (which functions as a second filtration tube supporter) is provided with a plurality of through holes which receive a plurality of the filtration tubes 1 respectively. The tube sheets 7a, 7b, and 7c are supported by the middle case 2b in a gas-tight manner. The upper tube sheet 7a is located at the outside and upper part of the filtration tube 1; the lower tube sheet 7c is located at the outside and lower part of the filtration tube 1; and the middle tube sheet 7b is located at the outside of the connecting part of the unit filtration tubes 1a. The tube sheets 7a, 7b, 7c support the filtration tubes 1 and the unit filtration tubes 1a as parts of the tube through sealing means for dust, respectively. Each of the tube sheets 7a, 7b, 7c is made of steel plate and has its upper and lower surfaces with an outer lining of a heat insulation material 6a. A coolant passage 8 is formed in each of the tube sheets 7a, 7b, 7c. Thus, a clean gas room, or filtration chamber, 10 is formed by the tube sheets and the middle case 2b. As clearly shown in FIG. 4, each of the tube sheets 7a, 7b, 7c is provided with a coolant inlet 8a at an outer peripheral surface of the middle case 2b and a coolant outlet 8b at a position diametrically opposing to the inlet 8a.

Figure 5:
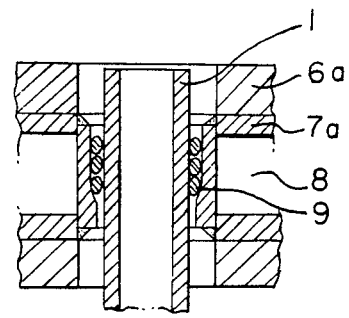
FIGS. 5, 6 and 7 are respectively enlarged views of Q part, R part and S part in FIG. 3.
Figure 6:
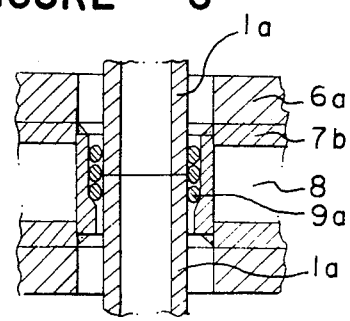
Figure 7:
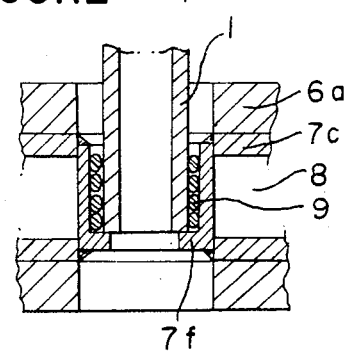
Figure 4:
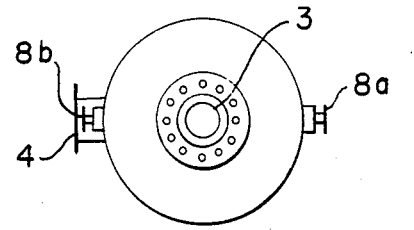

FIG. 5 shows the upper portion of the filtration tube 1 supported by the upper tube sheet 7a through packing members 9 as a sealing means for dust. FIG. 6 shows that the middle tube sheet 7b supports the connecting part of the adjacent unit filtration tubes 1a, 1a through packing members 9a. FIG. 7 shows the lower end of the filtration tube 1 supported by the lower tube sheet 7c through a socket 7f with its bottom opened, packing members 9 filling a space formed between the outer surface of the filtration tube and the inner surface of the socket 7f. The packing member 9 can be ceramic fiber rope, asbestos rope, carbon fiber rope, metal fiber rope made of a material such as stainless steel, a composite of these materials, or a molded product thereof which should have flexibility at a high temperature and prevent the dust in the dust-containing gas from passing through. It is also effective to use a combination of ceramic powder and any of these ropes for the purpose of sealing of the dust. The packing member 9a which supports elastically the connecting part of the adjacent unit filtration tubes 1a, 1a should have flexibility at a high temperature, but may not have sealing property to prevent the dust from passing if the connecting part of the unit filtration tubes 1a, 1a is closely in contact without any air gap. However, from the industrial viewpoint, packing member 9a is preferably the same material as that of the packing member 9 (i.e., it is preferably a sealing means for dust) because there is often a small air gap and one-side contact in the connecting part.

The size of the unit filtration tube 1a constituting the filtration tube 1 is determined taking account of its strength, the relationship between the natural frequency and an exciting frequency caused by acoustic resonance, earthquakes, and so on, the magnitude of an exciting force, easiness in handling at the time of assembling or repairing of the filtration tube, and cost for the tube sheets 7a, 7b, 7c, although unit filtration tubes having a smaller length can be used. For example, when a $\beta$-cordierite type ceramic, which is excellent in heat shock resistance, is used for the unit filtration tube, the length of the tube is preferably in a range from 0.8 to 2 m.

The operation of the apparatus according to the present invention will be described. In FIG. 3, the dust-containing gas G introduced into the upper case 2a from the dust-containing gas inlet 3 and scattered by the upper tube sheet 7a is fed into each of the filtration tubes 1 downwardly at the velocity of 5–50 m/s at the upper part of the filtration tubes 1. Since the filtration tube 1 of the present invention is made of ceramics having high hardness and is chemically stable and excellent in high temperature resistance (unlike a bag filter in which a filter bag is made of woven cloth or felt), there is no risk of causing erosion even though the dust-containing gas is introduced in the filtration tube 1 at such a high velocity. On the other hand, in the bag filter, the velocity of the dust-containing gas introduced into the filter bag is generally limited to 2 m/s or less from the viewpoint of prevention of the filter bag from breaking due to erosion.

While the dust-containing gas is caused to fall in the filtration tubes 1, the clean gas G' passes through the wall of the filtration tubes 1 to be discharged from the clean gas outlet 4. The velocity of the dust-containing gas in the downward direction decreases in a nearly linear manner as the gas goes from the upper part to the lower part of the filtration tubes 1 and becomes almost zero at the lower end of the filtration tubes 1. Since the dust-contained gas is introduced in the filtration tubes 1 at a high velocity, the coarse particle dust contained in the dust-containing gas has a large momentum. Accordingly, the coarse particle dust continues to move downwardly even though the velocity of the gas in the downward direction decreases. During downward movement of the gas, coarse particles gradually coagulate due to mutual collision together with deposition of fine particles, and the coagulated particles fall in the bottom of the lower case 2c to be discharged. On the other hand, fine particle dust is carried by a gas stream due to viscosity of the gas flowing in the radial direction and fills the pores in the surface area of the inner wall of the filtration tubes 1 to form a bridge of the fine particles. The dust-containing gas is precisely filtered by the bridge of the dust. Due to the scraping effect caused by collision of the coarse particle dust falling at a high velocity, formation of a fine particle dust layer projecting from the inner wall surface of the filtration tubes 1 is prevented. Thus, it is unnecessary to carry out reverse cleaning with use of the clean gas under a certain condition. The frequency of reverse cleaning can be reduced even if it is necessary, and sometimes it is sufficient to carry out the reverse cleaning from the lower part of the clean gas room, or filtration chamber, 10.

When the dust-containing gas has a high concentration of dust, the momentum of the dust at the inlet of the filtration tubes 1 is to large. This increases the probability of coagulation caused by mutual collision of the fine particles thereby agglomerating the fine particles into coarse particles. The consequence of this is useful both in inertial dust collection and in that it increases the scraping effect of the accumulated dust by the coarse particle dust.

Thus, use of a plurality of the elongated filtration tubes 1 and introduction of the dust-containing gas into the filtration tubes at a high velocity realizes a continuous treatment of the dust-containing gas in an industrial scale. Further, the structure of the filtration tubes 1 is highly reliable. Vibrations in the filtration tubes 1 are damped because the upper and lower ends of the filtration tubes 1 and the connecting parts of the unit filtration tubes 1a, 1a are respectively elastically supported through the packing members 9, 9a.

In a case of treating dust-containing gas of a high temperature such as 1000° C., cooling water is passed from the coolant inlet 8a through the coolant passage 8 to the coolant outlet 8b to prevent damage of the tube sheets 7a, 7b, 7c. The heat insulation materials 6, 6a provided on the tube sheets 7a, 7b, 7c and the cases 2a, 2b, 2c allows emission of the clean gas from the clean gas room, or filtration chamber, 10 through the filtration tubes 1 without heat loss, whereby heat energy can be effectively recovered from the clean gas.

In the preferred embodiment, water is used as a coolant. However, it is possible to use another liquid or gas, such as air or fluorinated hydrocarbon, as a coolant.

A dust-containing gas having a relatively low temperature (such as, for example, 600° C. or less) may be treated without cooling. When it is unnecessary to cool the tube sheets 7a, 7b, 7c, the coolant passage 8 and the heat insulation material 6a can be omitted. In this case, the container 2 should have an outer lining of the heat insulation material 6 instead of an inner lining. In this case, the material for the tube sheets 7a, 7b, 7c and the container 2 may be stainless steel, low alloy steel, mild steel, or the like, depending on the temperature and the nature of the dust-containing gas.

The middle tube sheet 7b may be omitted depending upon the amount of the gas to be treated and certain circumstances. In this case, the filtration tube 1 may be a unit filtration unit 1a itself, and the upper and lower part of the unit filtration tube 1a are supported by the upper and lower tube sheets 7a, 7c. Further, a clean gas inlet for reverse cleaning may be provided in each of the clean gas rooms, or filtration chamber 10. The dust-containing gas may be caused to flow in any direction in the filtration tube 1 so long as the gas flows downwardly in this embodiment.

THE SECOND EMBODIMENT

Several additional embodiments of the present invention will be described with reference to FIGS. 8 to 11. In these embodiments the same reference numerals as in FIG. 3 designate the same parts, and the description of these parts is therefore omitted.

Figure 8:
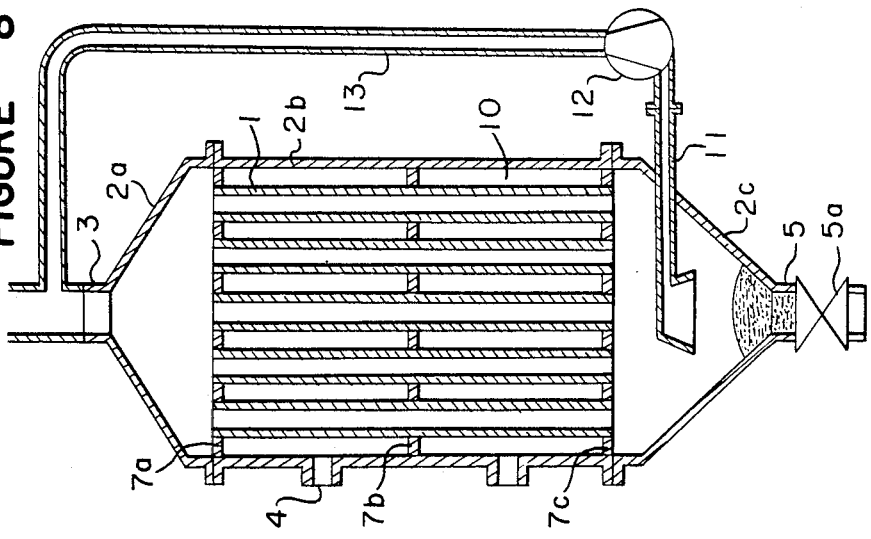

The embodiment shown in FIG. 8 is contrived so as to continuously scrape dust accumulated on the inner wall of the filtration tubes 1. The dust-containing gas is imparted a certain velocity in the downward direction even at the lower part of the filtration tubes to keep up the momentum of the coarse particle dust, which would otherwise fall in the lower part of the filtration tubes. Accordingly, the effect of scraping the accumulated dust by the coarse particle dust is obtained at the lower part of the filtration tubes 1. To accomplish this, a suction tube 11 is placed in the lower case 2c to take out a part of the dust-containing gas from the lower part of the filtration tubes 1. Preferably the opening of the suction tube 11 is directed downwardly at the near center inside the lower case 2c. The suction pipe 11 is preferably connected to a blower 12 (although an ejector or an injector may also be used). The suction pipe 11 is also connected to the dust-containing gas inlet 3 through a piping 13. With the provision of the suction pipe 11, the dust accumulated on the bottom of the lower case 2c is taken out from the dust discharging port 5 by intermittently opening the dust discharging valve 5a to the outside of the system, and a part of the dust-containing gas is taken out continuously from the suction pipe 11 to be delivered for circulation to the upper case 2a through the blower 12.

THE THIRD EMBODIMENT

Figure 9:
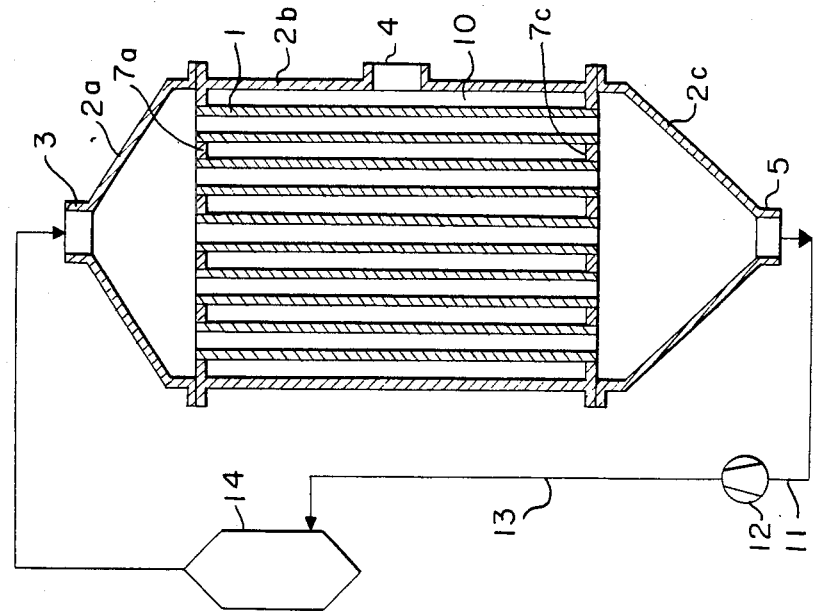
FIGS. 8, 9, 10 and 11 are respectively vertical views of further embodiments of the gas treating apparatus of the present invention.

Another embodiment shown in FIG. 9 is constructed in such a manner that a part of the dust-containing gas is continuously drawn through the dust discharging port 5 together with the dust falling on the bottom of the lower case 2c from the lower part of the filtration tubes 1. The dust and the gas are delivered for circulation to a dust producing source 14 through the blower 12, which may be replaced by an ejector or an injector. The dust producing source 14 is placed at the upstream of the gas treating apparatus and is connected to the blower 12 through a piping 13 so that the dust delivered from the lower case does not directly affect the concentration of dust in the dust-containing gas introduced into the dust-containing inlet 3. The dust producing source 14 is a regenerator or a reactor in the fluid catalytic cracking apparatus, a fluidized calcinator, a fluidized bed boiler, a converter, a blast furnace, and so on.

In the embodiments shown in FIGS. 8 and 9, it is unnecessary to carry out the reverse cleaning depending on the flow rate of gas drawn from the lower case 2c, the kind of dust, and the particle diameter distribution. It is desirable that the flow rate of the gas drawn from the lower case 2c is 5–25% of the flow rate of the dust-containing gas fed into the dust-containing gas treating apparatus (the flow rate of the dust containing gas is the same as that of the clean gas produced) in view of saving power and dust collecting efficiency. The velocity of the gas stream in the downward direction at the lower part of the filtration tubes 1 is preferably in the range from 0.3 to 4 m/s. With increase of the velocity from 0.3 m/s, the amount of the dust accumulated drops. When the velocity is about 4 m/s, the gas treating apparatus can be safely and continuously operated without reverse cleaning with a constant pressure difference between the interior and exterior of the filtration tubes 1, the pressure difference being such as 1500 mmAg or so, although the operating condition is determined by presence of coarse particles in the dust, the hardness of the particles, the shape of the particles, and other conditions.

THE FOURTH EMBODIMENT

Figure 10:
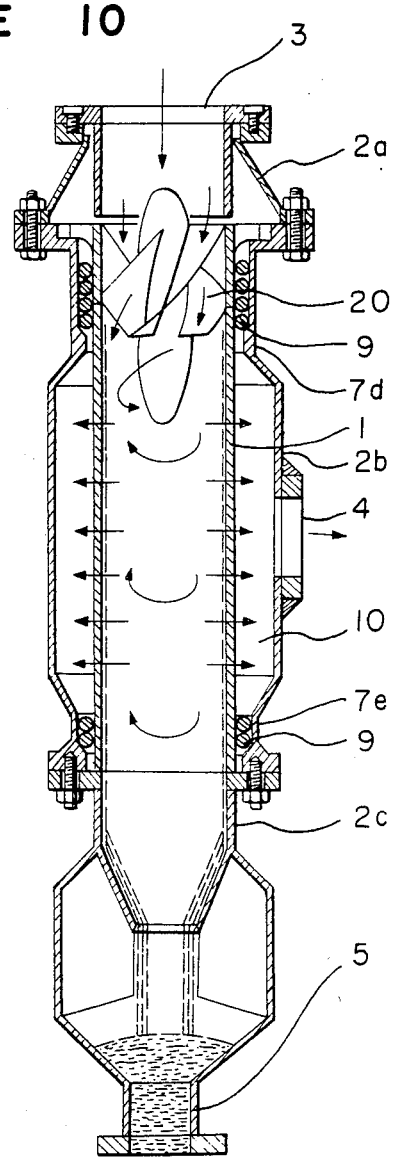

Still another embodiment shown in FIG. 10 is provided with a swirl vane 20 at the upper and inner part of the filtration tube 1 to impart a strong swirling action to the dust-containing gas introduced in the filtration tube. Accordingly, the coarse particle dust is separated by centrifugal force, and the coarse particle dust effectively scrapes the dust accumulated on the inner wall during its swirling movement along the peripheral direction of the inner wall of the filtration tube.

In FIG. 10, the filtration tube 1 is made of a solid porous material such as a ceramic sintering body. The filtration tube 1 is arranged in the vertical direction, and the middle case 2b made of steel surrounds the filtration tube 1 with a space therebetween. In the upper part and lower part of the middle case 2b, there are formed respectively an upper reduced diameter part 7d as a first filtration tube supporter and a lower reduced diameter part 7e as a second filtration tube supporter. The first and second filtration tube supporters respectively support the upper part and the lower part of the filtration tube 1 through the packing members 9 as sealing means for dust. The upper case 2a having the dust-containing gas inlet 3 is provided above the upper reduced diameter part 7d. The clean gas outlet 4 is formed in the side wall of the middle case 2b, and the lower case 2c having the dust discharging port 5 is provided below the lower reduced diameter part 7e.

When the dust-containing gas is fed through the dust-containing inlet 3, the dust-containing gas is subjected to a strong swirling force due to the swirl vane 20. Accordingly, the dust-containing gas descends downwardly in the filtration tube 1 while swirling, as shown by the arrow mark. Therefore, the dust descends while swirling along with the swirling stream and falls in the lower case 2c functioning as a dust hopper. At the same time, the dust-containing gas fed to the inside of the filtration tube 1 gradually passes through the wall of the filtration tube while descending in the tube to be discharged from the clean gas outlet 4 as a clean gas. In the filtration tube, the downward component of the velocity of the gas decreases as the gas goes from the upper part to the lower part of the filtration tube and becomes zero at the lower end of the filtration tube 1. On the other hand, the swirling velocity of the gas also decreases toward the lower part from the upper part of the filtration tube due to energy loss caused by the friction of the gas with the inner wall and the dust swirling. However, a swirling velocity of 2–3 m/s or more is maintained near the lower part of the inner wall of the filtration tube 1, with the result that the fine particles always scrape the dust accumulated on the inner wall.

The swirling stream in the filtration tube 1 performs centrigual separation of the dust. The coarse particle dust tends to gather on the wall side in the filtration tube for coagulation and falling due to gravity, while a part of the coarse particles dust and its coagulated body form, on the inner surface having a number of fine pores of the filtration tube, a filtration dust layer which performs highly effective dust collection and filtration. The fine particle dust is gathered in the axial center part of the filtration tube and descends under gravity while being coagulated.

THE FIFTH EMBODIMENT

Figure 11:
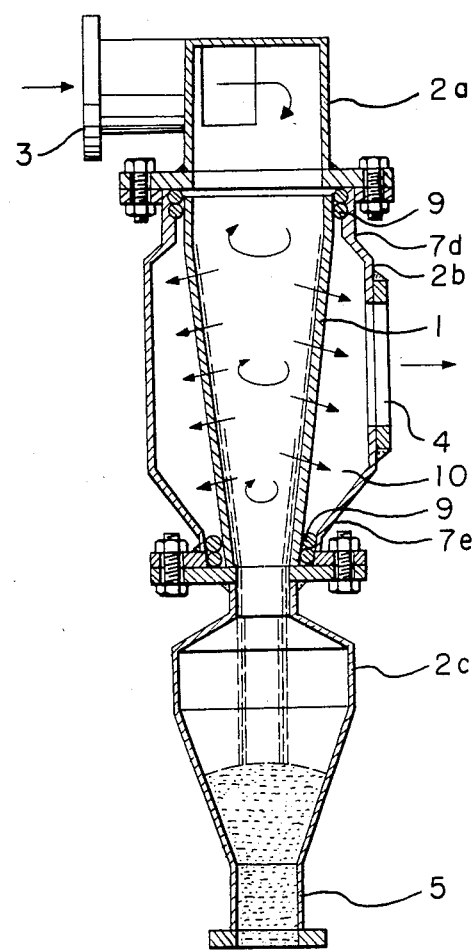

Another embodiment as shown in FIG. 11 has the same structure as that of the embodiment shown in FIG. 10 except that the filtration tube 1 is of a tapered shape with a lower reduced diameter portion and that the dust-containing gas inlet 3 is formed in such a manner that the gas is eccentrically introduced from the lateral side of the cylindrical upper case 2a instead of using the swirl vane. The provision of the dust-containing gas inlet 3 as above-mentioned imparts a swirling movement to the dust containing gas. Since the filtration tube is formed in a tapered shape with the lower reduced diameter portion, reduction in the swirling velocity of the gas at the lower part of the filtration tube is prevented. For this purpose, it is desirable to use either a filtration tube having a taper over its entire length or a filtration tube having a taper over its lower part.

In the embodiments shown in FIGS. 10 and 11, a part of the dust-containing gas is taken out from the lower case 2c to enhance the scraping effect of the dust accumulated on the inner wall of the filtration tube at its lower part. Further, in the embodiments shown in FIGS. 10 and 11, although only a single filtration tube is used, a plurality of filtration tubes may be provided as in the embodiment shown in FIG. 3, and swirling movement of the gas may be caused in each of the filtration tubes.

In accordance with the present invention, the following advantages can be provided: the amount of gas to be treated per unit area for installation is remarkably lareg; a high temperature dust-containing gas having a high dust concentration can be precisely filtered; reverse cleaning is not required as many times as is required in the conventional apparatus or is required only in a limited part. Further, the reverse cleaning may not be required at all depending on the kind of dust, particle size distribution, and so on. The present invention is applicable to the treatment of a high temperature dust-containing gas to obtain a high temperature clean gas without a substantial amount of heat loss. Therefore heat energy can be recovered in a subsequent step.

We claim:

1. Apparatus for treating dust-containing, high-temperature gas to separate the dust from the gas, said apparatus comprising:
   (a) a generally tower-shaped, vertically oriented container comprising an upper case containing a gas distribution chamber, a middle case, and a lower case which functions as a dust hopper;
   (b) an inlet for dust-containing gas in fluid communication with the gas distribution chamber in said upper case;
   (c) a discharging port for dust located at the bottom of said lower case;
   (d) a generally horizontal upper tube sheet disposed in said container in a gas-tight manner between said upper case and said middle case;
   (e) a generally horizontal lower tube sheet disposed in said container in a gas-tight manner between said middle case and said lower case;
   (f) at least one generally horizontal middle tube sheet disposed in said container between said upper and lower tube sheets;
   (g) a plurality of vertically disposed, horizontally spaced filtration tubes made of a solid porous material disposed in said container and extending from said upper tube sheet to said lower tube sheet through said at least one generally horizontal middle tube sheet, each of said filtration tubes having an open upper end received in a gas-tight manner in said upper tube sheet by a gas tight connection and in fluid communication with the gas distribution chamber in said upper case and an open lower end received in a gas-tight manner in said lower tube sheet by a gas tight connection and in fluid communication with the dust hopper in said lower case, each of said plurality of filtration tubes being formed of a plurality of unit filtration tubes which are coaxially disposed in a gas-tight manner by a gas tight connection;
   (h) at least one clean gas outlet in said middle case, said at least one clean gas outlet providing fluid communication between the exterior of said middle case and the interior of said middle case outside said filtration tubes;
   (i) a passage for coolant disposed in at least some of said tube sheets;
   (j) an inlet for coolant in fluid communication with each of said passages for coolant; and
   (k) an outlet for coolant in fluid communication with each of said passages for coolant.

2. Apparatus as recited in claim 1 and further comprising a discharging valve located in said discharging port.

3. Apparatus as recited in claim 1 wherein said container is made of steel and has an inner lining of a heat insulation material.

4. Apparatus as recited in claim 1 wherein the interfaces between adjacent unit filtration tubes are located inside said at least one middle tube sheet.

5. Apparatus as recited in claim 1 wherein:
(a) said tube sheets are made of steel plate and
(b) the upper and lower surfaces of said tube sheets have an outer lining of a heat insulation material.

6. Apparatus as recited in claim 1 wherein the gas-tight connection between said filtration tubes and said upper and lower tube sheets is provided by a packing made of a material which is flexible at high temperatures.

7. Apparatus as recited in claim 1 wherein said filtration tubes are made of ceramic.

8. Apparatus as recited in claim 1 wherein said passage for coolant is disposed in each of said tube sheets.

9. Apparatus as recited in claim 1 and further comprising means for creating a lower pressure in the dust hopper in said lower case then in the gas distribution chamber in said upper case.

10. Apparatus as recited in claim 9 wherein said means for creating a lower pressure comprises a passageway through which gas in the dust hopper in said lower case is fed to a dust producing source which is in fluid communication with the gas distribution chamber in said upper case.

11. Apparatus as recited in claim 9 wherein said means for creating a lower pressure comprises a passageway through which gas in the dust hopper in said lower case is recirculated to the gas distribution chamber in said upper case.

12. Apparatus as recited in claim 1 and further comprising means for causing the gas to swirl around the vertical axes of said filtration tubes.

13. Apparatus as recited in claim 12 wherein the cross-sectional areas of said filtration tubes decrease from top to bottom to compensate for losses in the swirling velocity of the gas.

14. Apparatus as recited in claim 1 wherein said filtration tubes are circular in cross-section.

15. Apparatus as recited in claim 1 wherein said at least one middle tube sheet comprises a plurality of generally horizontal middle tube sheets disposed in said container between said upper and lower tube sheets.

16. Apparatus as recited in claim 15 and further comprising additional clean gas outlets in said middle case located between each adjacent pair of said plurality of middle tube shsets, said additional clean gas outlets providing fluid communication between the exterior of said middle case and the interior of said middle case outside said filtration tubes.

17. Apparatus as recited in claim 1 wherein said at least one generally horizontal middle tube sheet is disposed in said container in a gas-tight manner between said upper and lower tube sheets.

* * * * *

UNITED STATES PATENT AND TRADEMARK OFFICE
CERTIFICATE OF CORRECTION

PATENT NO. : 4,584,003

DATED : April 22, 1986

INVENTOR(S) : Noriyuki Oda, Haruo Watanabe, and Tomohiro Morishita

It is certified that error appears in the above-identified patent and that said Letters Patent is hereby corrected as shown below:

Column 13, line 19, change "then" to -- than --.

Signed and Sealed this

Fourteenth Day of October, 1986

[SEAL]

Attest:

DONALD J. QUIGG

Attesting Officer

Commissioner of Patents and Trademarks